(12) United States Patent
Kohlndorfer

(10) Patent No.: US 8,523,229 B1
(45) Date of Patent: Sep. 3, 2013

(54) SEATBELT HEIGHT ADJUSTER ASSEMBLY

(75) Inventor: Kenneth Kohlndorfer, Roseville, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/611,537

(22) Filed: Sep. 12, 2012

(51) Int. Cl.
*B60R 22/20* (2006.01)

(52) U.S. Cl.
USPC ............. 280/801.2; 280/801.1; 280/808; 297/482; 297/483

(58) Field of Classification Search
USPC ............. 280/801.1, 801.2, 808; 297/468, 297/482, 483
See application file for complete search history.

(56) References Cited

U.S. PATENT DOCUMENTS

| | | | | |
|---|---|---|---|---|
| 4,989,900 A | * | 2/1991 | Steinhuser | 280/808 |
| 5,044,666 A | * | 9/1991 | Griesemer | 280/801.2 |
| 5,460,410 A | * | 10/1995 | Petzi et al. | 280/801.2 |
| 5,482,325 A | * | 1/1996 | Moller et al. | 280/801.2 |
| 6,186,548 B1 | * | 2/2001 | McFalls | 280/801.2 |
| 7,021,662 B2 | * | 4/2006 | Hoffmann et al. | 280/801.2 |
| 7,182,370 B2 | * | 2/2007 | Arnold | 280/801.2 |
| 7,461,866 B2 | * | 12/2008 | Desmarais et al. | 280/801.2 |
| 7,513,531 B2 | * | 4/2009 | Gray | 280/801.2 |
| 8,136,841 B2 | * | 3/2012 | Omiya et al. | 280/801.2 |
| 2006/0091666 A1 | * | 5/2006 | Arnold et al. | 280/801.2 |

* cited by examiner

*Primary Examiner* — Ruth Ilan
*Assistant Examiner* — Darlene P Condra
(74) *Attorney, Agent, or Firm* — Brinks Hofer Gilson & Lione

(57) ABSTRACT

A height adjuster assembly for motor vehicle belt restraint systems adapted to be mounted to a motor vehicle "B" pillar for affixing a D-ring belt anchorage. The height adjuster assembly can be moved to a plurality of vertical positions for optimally locating a seat belt and D-ring. The adjuster assembly includes a slider assembly movable along a rail preferably formed by a roll forming operation. A rotatable pawl within the slider assembly is biased into engagement with the rail teeth and is held in a normally locked position. A pushbutton can be actuated to rotate the lock pawl to a disengaged position allowing vertical adjustment. The system features few parts, low-cost construction, and provides high structural integrity.

16 Claims, 2 Drawing Sheets

SEATBELT HEIGHT ADJUSTER ASSEMBLY

FIELD OF THE INVENTION

This invention relates to a seatbelt anchor assembly adapted for use as part of a motor vehicle seatbelt occupant restraint assembly. More specifically, the invention relates to a height adjuster assembly for a D-ring for a seatbelt restraint system having a height adjustment feature.

BACKGROUND OF THE INVENTION

Seatbelt assemblies are in widespread use in motor vehicles. Present systems have certain common elements including seatbelt webbing which extends across the upper and lower torso of the occupant, and a retractor for allowing protraction and retraction of the webbing so that the belt may adapt to different sizes of occupants, and be conveniently out of the way when not being used. Seatbelt assemblies further typically include a buckle mounted to the vehicle which releasably attaches to a latch plate. Other common elements include deflectors or D-rings mounted to the vertical "B" pillar of the vehicle body which reroute the webbing to properly position it with respect to the occupant and to provide the desired impact restraint performance along with comfort and convenience of use. D-rings are of a fixed type which is not adjustable, or may be provided with a height adjustment feature which allows the D-ring to be set at various vertical positions for an occupant.

Height adjuster assemblies for D-rings are used in many vehicles. These systems generally operate satisfactorily; however, current designs often have buzz-squeak-rattle ("BSR") problems due to the movement of individual components during operation of the vehicle. Current designs of such assemblies also typically have many components and are costly to manufacture and assemble. Due to the extreme loading conditions imposed on all restraint system components including the D-rings, they must be made to bear these loads, which further contributes to the cost concerns mentioned previously. Presently available height adjustable assemblies for D-rings also typically have few discrete adjusted position options, commonly around four to six such positions. It is a desirable feature for these devices to provide a greater range and fineness of adjustment.

The height adjuster assembly D-rings in accordance with the present invention provides numerous benefits. The construction of the assembly of this invention includes few discrete components, and which can be manufactured in a cost effective manner. The assembly has features making it inherently less likely to produce BSR problems. The assembly of the system is also simple, without special equipment requirements for fabrication or assembly. The assembly provides exceptional strength and is maintained in a normally locked condition for performance security. As with all components for use in mass-produced motor vehicles, cost concerns are significant. The assembly in accordance with the present invention can be produced in a very cost-effective manner, desirable for both manufacturers and purchasers of motor vehicles.

Seatbelt assemblies must be securely affixed to motor vehicle structural components in order to provide the necessary restraint effect in vehicle impact conditions and further to meet government regulations. The height adjuster assembly of this invention is designed to meet stringent loading requirements, while providing the other benefits mentioned previously.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
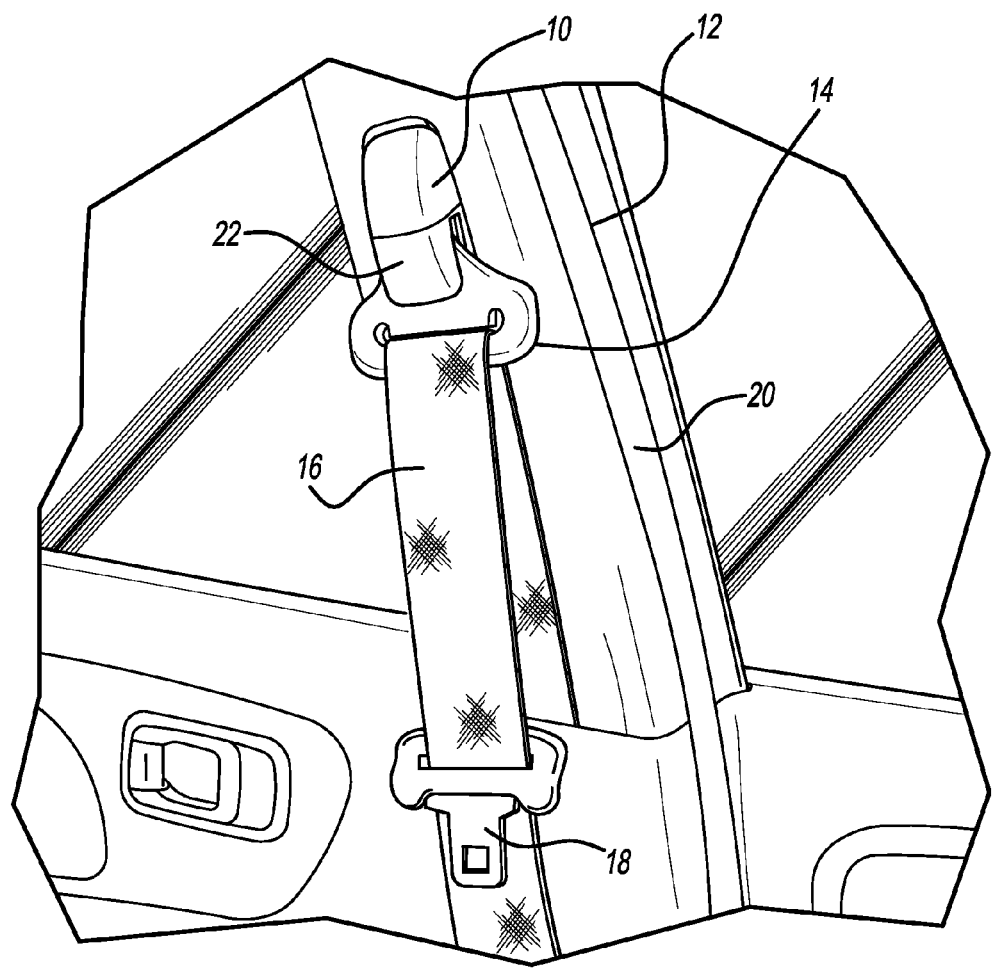
FIG. 1 is a pictorial view of a typical height adjuster for D-rings shown installed on the interior side of the vehicle body "B" pillar.

A height adjuster assembly in accordance with the present invention is illustrated by the figures and is generally designated by reference number 10. As shown in FIG. 1, height adjuster assembly 10 is shown installed on the interior side of a motor vehicle "B" pillar 12. Height adjuster assembly 10 provides an anchorage for seatbelt D-ring 14 for anchoring and guiding seatbelt webbing 16. Latch plate 18 is either slidable along the length of webbing 16 or is fastened to it, depending on whether the seat belt system is of a single or a dual retractor variety. For benefits of comfort and convenience and other factors, height adjuster assembly 10 has a slider assembly 26 which can be moved vertically to a plurality of adjusted positions. To enhance the aesthetic appeal of the system, "B" pillar 12 typically includes an interior trim cover 20. In addition, height adjuster assembly 10 includes trim cover 22. The mechanism for achieving the adjustment and securing of height adjuster assembly 10 is described in more detail in the following description.

Figure 2:
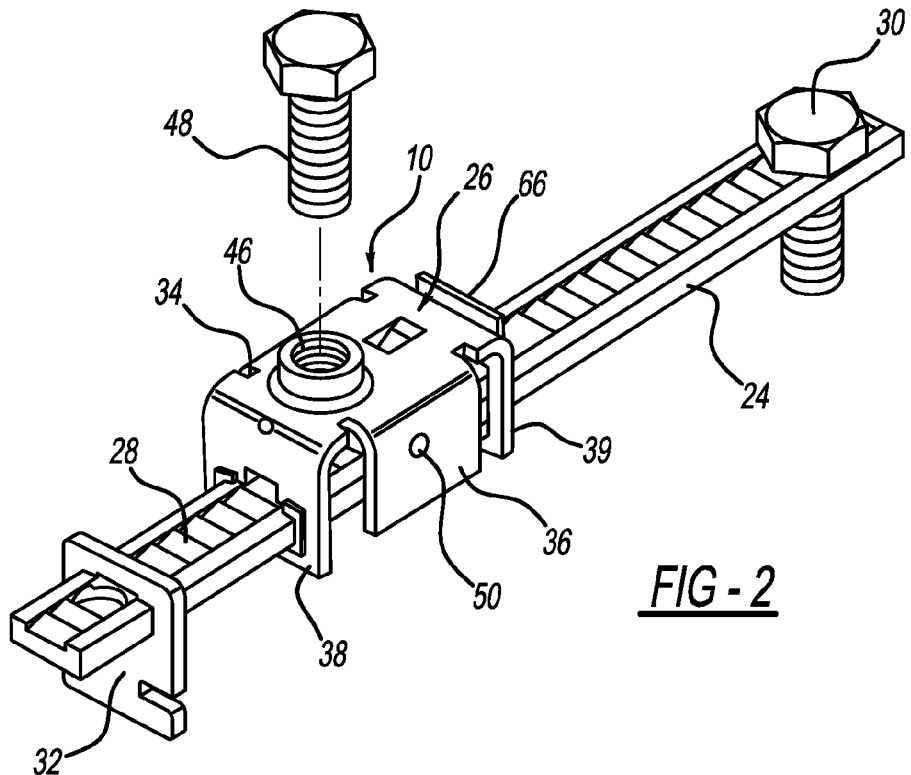
FIG. 2 is a pictorial view of the height adjuster assembly in accordance with the present invention.
Figure 3:
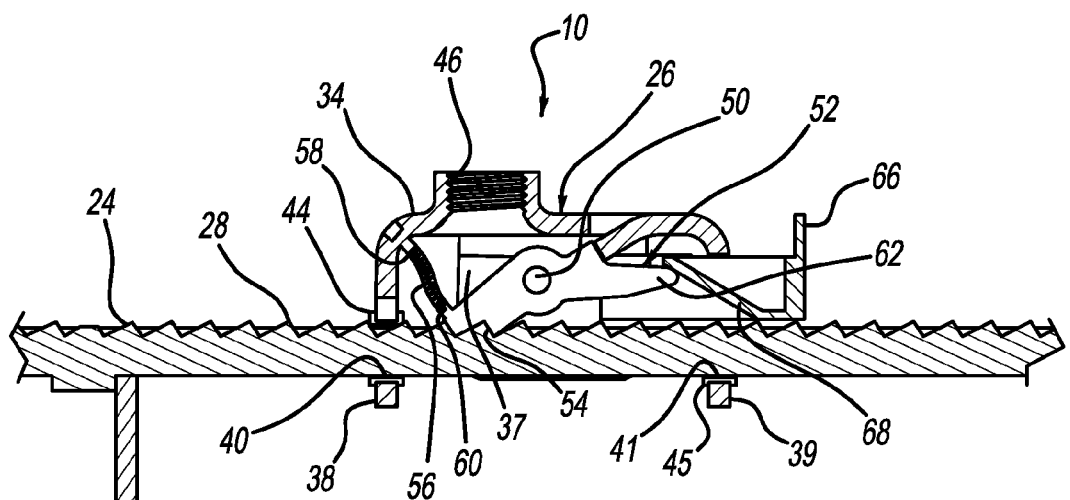
FIG. 3 is a cross-sectional view of the height adjuster assembly shown in FIG. 2.

With particular reference to FIGS. 2 and 3, the internal components and features of height adjuster assembly 10 are shown. Height adjuster assembly 10 primarily includes rail or rack 24, and an adjustable slider assembly 26. Rail 24 includes a series of a ramped teeth 28. Preferably rail 24 is formed by a roll forming operation on a metal strip which contributes to low-cost manufacture. The upper end of rail 24 is secured to the vehicle interior structure via anchor bolt 30. The opposite end of rail 24 may also be a fixed using another anchor bolt (not shown) or a bracket 32 as shown in FIG. 2. In any design variation, it is essential that rail 24 and its attachment system provides secure fastening with sufficient structural integrity to bear restraint system loads.

Slider assembly 26 is formed from a main housing 34, preferably formed from a sheet metal blank. As shown in FIGS. 2 and 3, housing 34 includes side legs 36 and 37 positioned to embrace the lateral edges of rail 24, as well as slide legs 38 and 39. Slide legs 38 and 39 incorporate apertures 40 and 41, respectively, which receive rail 24. To reduce BSR concerns and to facilitate the smooth adjustment of the position of slider assembly 26, bushings or bearings 44 and 45 are provided. Bearings 44 and 45 can be made of various materials, for example of a resin composition such as Nylon or a Nylon-like material which provides lubricity and sufficient strength. Bearings 44 and 45 are preferably snap-fit into their corresponding apertures 40 and 41, and may have a continuous closed loop or letter "C" configuration. The provision of slide legs 36 through 39 serve to increase the strength of housing 34 necessary to withstand restraint loads.

The upper surface of housing 34 are preferably includes a formed bolt hole 46 which may be pre-threaded to receive anchor bolt 48. By forming bolt hole 46 integral with housing 34, the need for a separate weldnut or other type of fastener carried by slider assembly 26 is avoided.

Pivot pin 50 extends laterally through the interior cavity formed by housing 34 and passes through side legs 36 and 37. Pivot pin 50 provides for mounting and allowing the pivoting motion of lock pawl 52. Lock pawl 52 includes engagement edge 54 which has a profile matching that of the ramped configuration of teeth 28. Lock spring 56 is a coiled compression spring which engages at its opposite ends with spring posts 58 and 60. Lock spring 56 exerts an extending force on lock pawl 52 to bias it in a counterclockwise direction, toward the position shown in FIG. 3, which as will be explained, is the locked position for the pawl. Pawl leg 62 engages with slider housing 64 which serves to prevent pawl 52 from over rotating in the clockwise direction (as shown in the figure) needed to maintain lock spring 56 in an assembled condition.

Release button 66 can be engaged by an operator to rotate pawl 52 in the clockwise, released position. Release button 66 is preferably formed of a molded material and can be depressed by moving it in the downward direction (referring to the mounted position shown in FIG. 1) which causes ramped surface 68 to engage with lock pawl leg 62, urging the pawl to move in a clockwise direction against the force exerted by lock spring 56. Slider assembly 26 is enclosed by molded trim cover 22. Not shown in FIGS. 2 and 3 is a conventional seatbelt D-ring 14 attached by bolt 48 to the slider assembly.

Slider assembly 26 has a very simple construction and advantageously, when restraint forces act on the slider assembly which are predominately in the downward direction. Lock pawl 52 is loaded in compression which is advantageous from a structural integrity perspective. The spring loading provided by lock spring 56 also reduces the likelihood of loose parts and BSR problems. The internal components of the adjuster 10 are normally maintained with forces acting on them so that they are not loose. The design further places the device in a normally locked position, advantageous for reliability considerations. This compressive loading is provided by the positioning of the pawl pivot pin 50 above the pawl engagement edge 54 with the predominant restraint loads acting downwardly on D-ring 14 (toward the left as the system is shown in FIG. 3). The configuration of engagement edge 54 and ramp teeth 28 along with pawl 52 allow slider assembly 26 to be moveable upwardly by pushing the unit in that direction, causing the pawl to ratchet over the teeth.

While the above description constitutes the preferred embodiment of the present invention, it will be appreciated that the invention is susceptible to modification, variation and change without departing from the proper scope and fair meaning of the accompanying claims.

The invention claimed is:

1. A height adjuster assembly for a motor vehicle belt restraint system adapted for mounting a belt system D-ring, comprising:
   a rail adapted to be mounted to the motor vehicle, the rail forming a plurality of ramp shaped teeth, and
   a slider assembly adapted to be fixed to and movable along the rail and further having a housing forming first and second slide legs having apertures for receiving the rail and further having a upper surface adapted for mounting the D-ring, and further having a pawl pivotably mounted within the housing and forming an engagement edge closely conforming to the profile of the rail teeth, the pawl movable between an engaged position in which the engagement edge meshes with the rail teeth and a disengaged position in which the pawl engagement edge is disengaged from the rail teeth, a spring biasing the pawl toward the engaged position, a release button actuatable to act on the pawl to move it toward the disengaged position, in the mounted position of the slider assembly a pivot pin being located above the pawl engagement edge whereby the pawl is loaded in compression between the pivot pin and engagement edge upon restraint loads acting on the slider assembly.

2. A height adjuster assembly in accordance with claim 1 further comprising rail mounting features in the form of at least one bolt affixing the rail to the vehicle structure.

3. A height adjuster assembly in accordance with claim 1 further comprising a bracket mounted to the vehicle having a bracket aperture for receiving the rail.

4. A height adjuster assembly in accordance with claim 1 further comprising the housing upper surface forming a bolt hole.

5. A height adjuster assembly in accordance with claim 4 further comprising the bolt hole is threaded.

6. A height adjuster assembly in accordance with claim 1 further comprising the slider assembly housing further having at least one bushing installed within the first or second leg apertures for providing a bearing surface.

7. A height adjuster assembly in accordance with claim 1 further comprising the spring in the form of a coil compression spring.

8. A height adjuster assembly in accordance with claim 1 further comprising the release button having a ramped surface which interacts with a leg formed by the pawl.

9. A height adjuster assembly in accordance with claim 1 further comprising the housing further forming a pair of side legs which extend over lateral edges of the rail.

10. A height adjuster assembly for a motor vehicle belt restraint system adapted for mounting a belt system D-ring, comprising:
    a rail adapted to be mounted to the motor vehicle, the rail forming a plurality of ramp shaped teeth, and
    a slider assembly adapted to be fixed to and movable along the rail and further having a housing forming first and second slide legs having apertures for receiving the rail and further having a upper surface the upper surface forming a bolt hole for mounting the D-ring, the housing further forming a pair of side legs which extend over lateral edges of the rail, the slider assembly further having a pawl pivotably mounted within the housing and forming an engagement edge closely conforming to the profile of the rail teeth, the pawl movable between an engaged position in which the engagement edge meshes with the rail teeth and a disengaged position in which the pawl engagement edge is disengaged from the rail teeth, a spring biasing the pawl toward the engaged position, a release button actuatable to act on the pawl to move it toward the disengaged position, in the mounted position of the slider assembly a pivot pin being located above the pawl engagement edge whereby the pawl is loaded in compression between the pivot pin and engagement edge upon restraint loads acting on the slider assembly.

11. A height adjuster assembly in accordance with claim 10 further comprising rail mounting features in the form of at least one bolt affixing the rail to the vehicle structure.

12. A height adjuster assembly in accordance with claim 10 further comprising a bracket mounted to the vehicle having a bracket aperture for receiving the rail.

13. A height adjuster assembly in accordance with claim 10 further comprising the bolt hole is threaded.

14. A height adjuster assembly in accordance with claim 10 further comprising the slider assembly housing further having at least one bushing installed within the first or second leg apertures for providing a bearing surface.

15. A height adjuster assembly in accordance with claim 10 further comprising the spring in the form of a coil compression spring.

16. A height adjuster assembly in accordance with claim 10 further comprising the release button having a ramped surface which interacts with a leg formed by the pawl.

\* \* \* \* \*